United States Patent
Mæhle

(10) Patent No.: US 12,503,315 B2
(45) Date of Patent: Dec. 23, 2025

(54) SYSTEM AND METHOD FOR DETECTION OF ANOMALIES IN THE TRACKS ON A THREE-DIMENSIONAL STORAGE SYSTEM

(71) Applicant: Autostore Technology AS, Nedre Vats (NO)

(72) Inventor: Ole Alexander Mæhle, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 477 days.

(21) Appl. No.: 18/007,380

(22) PCT Filed: Aug. 11, 2021

(86) PCT No.: PCT/EP2021/072360
§ 371 (c)(1),
(2) Date: Jan. 30, 2023

(87) PCT Pub. No.: WO2022/034123
PCT Pub. Date: Feb. 17, 2022

(65) Prior Publication Data
US 2023/0286758 A1    Sep. 14, 2023

(30) Foreign Application Priority Data
Aug. 12, 2020    (NO) .................................. 20200896

(51) Int. Cl.
*B65G 43/02*    (2006.01)
*B65G 1/04*    (2006.01)
(Continued)

(52) U.S. Cl.
CPC ........... *B65G 43/02* (2013.01); *B65G 1/0464* (2013.01); *G06T 7/0002* (2013.01); *H04N 23/54* (2023.01);
(Continued)

(58) Field of Classification Search
CPC ............................. B65G 43/02; B65G 1/0464; B65G 2203/041; B65G 2203/042; B65G 43/00;
(Continued)

(56) References Cited

U.S. PATENT DOCUMENTS 10,882,540 B2 *  1/2021  Stadie ....................... B08B 3/02
11,117,760 B2 *  9/2021  Wagner .................. B65G 1/065
(Continued)

FOREIGN PATENT DOCUMENTS

GB        2539562 A     12/2016
NO         317366 B1    10/2004
(Continued)

OTHER PUBLICATIONS

International Search Report issued in PCT/EP2021/072360 on Dec. 8, 2021 (4 pages).
(Continued)

*Primary Examiner* — Michael Collins
(74) *Attorney, Agent, or Firm* — Baker Botts L.L.P.

(57) ABSTRACT

A system for condition-based monitoring of an automated storage and retrieval system includes a framework structure forming a three-dimensional storage grid structure for storing storage containers for storing items. The grid structure forms vertical storage columns each having a horizontal area defined by the size of an access opening of the vertical storage columns. The framework structure includes a rail system arranged above the storage columns. The rail system includes a plurality of rails extending in an X-direction and a Y-direction to form a grid. The rails define a perimeter of each access opening on top of each storage column. The rail system provides available routes in the X-direction or the Y-direction for container handling vehicles handling and transferring the storage containers to and from the storage columns. At least one container handling vehicle has two or
(Continued)

more sensors, directed to monitor a section of the rails adjacent of the container handling vehicle. The sensors are part of a monitoring system set up to report a condition of the rails of the grid system and uploading the information to one or all of a central computer system, a cloud system, and/or an image analysis and processing system. The two or more sensors are at least one camera and a pendulum, and/or a level, and/or an accelerometer, and/or a sound detecting device.

18 Claims, 8 Drawing Sheets

(51) Int. Cl.
  *G06T 7/00* (2017.01)
  *H04N 23/54* (2023.01)
  *H04N 23/90* (2023.01)
(52) U.S. Cl.
  CPC ....... *H04N 23/90* (2023.01); *B65G 2203/041* (2013.01); *B65G 2203/042* (2013.01); *G06T 2207/20081* (2013.01)
(58) Field of Classification Search
  CPC .. B65G 2207/48; B65G 1/0478; B65G 1/065; B65G 2201/0235; B65G 1/04; G06T 7/0002; G06T 2207/20081; H04N 23/54; H04N 23/90
  See application file for complete search history.

(56) References Cited

U.S. PATENT DOCUMENTS

| | | | | |
|---|---|---|---|---|
| 12,116,206 | B2* | 10/2024 | Stadie | B65G 1/0464 |
| 12,365,543 | B2* | 7/2025 | Gjerdevik | B65G 1/0492 |
| 2012/0152877 | A1 | 6/2012 | Tadayon | |
| 2018/0148076 | A1 | 5/2018 | Chien et al. | |
| 2021/0237973 | A1* | 8/2021 | Heggebø | B65G 1/0457 |
| 2023/0174302 | A1* | 6/2023 | Austrheim | B65G 1/0464 414/495 |
| 2023/0183004 | A1* | 6/2023 | Austrheim | B65G 1/0471 414/280 |

FOREIGN PATENT DOCUMENTS

| | | |
|---|---|---|
| WO | 2014/075937 A1 | 5/2014 |
| WO | 2014/090684 A1 | 6/2014 |
| WO | 2015/193278 A1 | 12/2015 |
| WO | 2018/146304 A1 | 8/2018 |
| WO | 2019/238670 A1 | 12/2019 |
| WO | 2020/151866 A1 | 7/2020 |
| WO | 2021/197914 A1 | 10/2021 |

OTHER PUBLICATIONS

Written Opinion of the International Searching Authority issued in PCT/EP2021/072360 on Dec. 8, 2021 (11 pages).
Norwegian Search Report issued in No. 20200896 mailed on Mar. 5, 2021 (2 pages).
Schneider, Marc, Office Action for European Patent Application No. 21762413.9, dated Nov. 28, 2024, 4 pages, pub. by the EPO, Rijswijk Netherlands.
Schneider, Marc, "Extended European Search Report" for European patent application No. EP24220235.6, dated Apr. 24, 2025, 9 pages, published by the European Patent Office, Munich, Germany.
Fukushima, Kazuyuki, Office Action in JP2023509694, mailed Sep. 3, 2025, 8 pages, Japan Patent Office, Tokyo, Japan.

\* cited by examiner

SYSTEM AND METHOD FOR DETECTION OF ANOMALIES IN THE TRACKS ON A THREE-DIMENSIONAL STORAGE SYSTEM

The present invention regards a system and a method for condition-based monitoring of an automated storage and retrieval system, and more particularly a system and a method for condition-based monitoring of an automated storage and retrieval system for detecting anomalies in the three-dimensional storage system.

BACKGROUND AND PRIOR ART

FIG. 1 discloses a typical prior art automated storage and retrieval system 1 with a framework structure 100 and FIGS. 2 and 3 disclose two different prior art container handling vehicles 201, 301 suitable for operating on such a system 1.

The framework structure 100 comprises upright members 102, horizontal members 103 and a storage volume comprising storage columns 105 arranged in rows between the upright members 102 and the horizontal members 103. In these storage columns 105 storage containers 106, also known as bins, are stacked one on top of one another to form stacks 107. The members 102, 103 may typically be made of metal, e.g. extruded aluminium profiles.

The framework structure 100 of the automated storage and retrieval system 1 comprises a rail system 108 arranged across the top of framework structure 100, on which rail system 108 a plurality of container handling vehicles 201, 301 are operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 201, 301 in a first direction X across the top of the frame structure 100, and a second set of parallel rails 111 arranged perpendicular to the first set of rails 110 to guide movement of the container handling vehicles 201, 301 in a second direction Y which is perpendicular to the first direction X. Containers 106 stored in the columns 105 are accessed by the container handling vehicles through access openings 112 in the rail system 108. The container handling vehicles 201, 301 can move laterally above the storage columns 105, i.e. in a plane which is parallel to the horizontal X-Y plane.

The upright members 102 of the framework structure 100 may be used to guide the storage containers during raising of the containers out from and lowering of the containers into the columns 105. The stacks 107 of containers 106 are typically self-supportive.

Each prior art container handling vehicle 201, 301 comprises a vehicle body 201a, 301a, and first and second sets of wheels 201b, 301b, 201c, 301c which enable the lateral movement of the container handling vehicles 201, 301 in the X direction and in the Y direction, respectively. In FIGS. 2 and 3 two wheels in each set are fully visible. The first set of wheels 201b, 301b is arranged to engage with two adjacent rails of the first set 110 of rails, and the second set of wheels 201c, 301c is arranged to engage with two adjacent rails of the second set 111 of rails. At least one of the sets of wheels 201b, 301b, 201c, 301c can be lifted and lowered, so that the first set of wheels 201b, 301b and/or the second set of wheels 201c, 301c can be engaged with the respective set of rails 110, 111 at any one time.

Each prior art container handling vehicle 201, 301 also comprises a lifting device (not shown) for vertical transportation of storage containers 106, e.g. raising a storage container 106 from, and lowering a storage container 106 into, a storage column 105. The lifting device comprises one or more gripping/engaging devices which are adapted to engage a storage container 106, and which gripping/engaging devices can be lowered from the vehicle 201, 301 so that the position of the gripping/engaging devices with respect to the vehicle 201, 301 can be adjusted in a third direction Z which is orthogonal the first direction X and the second direction Y. Parts of the gripping device of the container handling vehicle 301 are shown in FIG. 3 indicated with reference number 304. The gripping device of the container handling device 201 is located within the vehicle body 301a in FIG. 2.

Conventionally, and also for the purpose of this application, $Z=1$ identifies the uppermost layer of storage containers, i.e. the layer immediately below the rail system 108, $Z=2$ the second layer below the rail system 108, $Z=3$ the third layer etc. In the exemplary prior art disclosed in FIG. 1, $Z=8$ identifies the lowermost, bottom layer of storage containers. Similarly, $X=1 \ldots n$ and $Y=1 \ldots n$ identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position $X=10$, $Y=2$, $Z=3$. The container handling vehicles 201, 301 can be said to travel in layer $Z=0$, and each storage column 105 can be identified by its X and Y coordinates.

The storage volume of the framework structure 100 has often been referred to as a grid 104, where the possible storage positions within this grid are referred to as storage cells. Each storage column may be identified by a position in an X- and Y-direction, while each storage cell may be identified by a container number in the X-, Y and Z-direction.

Each prior art container handling vehicle 201, 301 comprises a storage compartment or space for receiving and stowing a storage container 106 when transporting the storage container 106 across the rail system 108. The storage space may comprise a cavity arranged centrally within the vehicle body 201a as shown in FIG. 2 and as described in e.g. WO2015/193278A1, the contents of which are incorporated herein by reference.

FIG. 3 shows an alternative configuration of a container handling vehicle 301 with a cantilever construction. Such a vehicle is described in detail in e.g. NO317366, the contents of which are also incorporated herein by reference.

The central cavity container handling vehicles 201 shown in FIG. 2 may have a footprint that covers an area with dimensions in the X and Y directions which is generally equal to the lateral extent of a storage column 105, e.g. as is described in WO2015/193278A1, the contents of which are incorporated herein by reference. The term 'lateral' used herein may mean 'horizontal'.

Alternatively, the central cavity container handling vehicles 101 may have a footprint which is larger than the lateral area defined by a storage column 105, e.g. as is disclosed in WO2014/090684A1.

The rail system 108 typically comprises rails with grooves in which the wheels of the vehicles run. Alternatively, the rails may comprise upwardly protruding elements, where the wheels of the vehicles comprise flanges to prevent derailing. These grooves and upwardly protruding elements are collectively known as tracks. Each rail may comprise one track, or each rail may comprise two parallel tracks.

WO2018146304, the contents of which are incorporated herein by reference, illustrates a typical configuration of rail system 108 comprising rails and parallel tracks in both X and Y directions.

In the framework structure 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 201, 301 to drop off and/or pick up storage containers 106 so that they can be transported to an access station (not shown) where the storage containers 106 can be accessed from outside of the framework structure 100 or transferred out of or into the framework structure 100. Within the art, such a location is normally referred to as a 'port' and the column in which the port is located may be referred to as a 'port column' 119, 120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119, 120 for further transportation to an access station. Note that the term 'tilted' means transportation of storage containers 106 having a general transportation orientation somewhere between horizontal and vertical.

In FIG. 1, the first port column 119 may for example be a dedicated drop-off port column where the container handling vehicles 201, 301 can drop off storage containers 106 to be transported to an access or a transfer station, and the second port column 120 may be a dedicated pick-up port column where the container handling vehicles 201, 301 can pick up storage containers 106 that have been transported from an access or a transfer station.

The access station may typically be a picking or a stocking station where product items are removed from or positioned into the storage containers 106. In a picking or a stocking station, the storage containers 106 are normally not removed from the automated storage and retrieval system 1 but are returned into the framework structure 100 again once accessed. A port can also be used for transferring storage containers to another storage facility (e.g. to another framework structure or to another automated storage and retrieval system), to a transport vehicle (e.g. a train or a lorry), or to a production facility.

A conveyor system comprising conveyors is normally employed to transport the storage containers between the port columns 119, 120 and the access station.

If the port columns 119, 120 and the access station are located at different levels, the conveyor system may comprise a lift device with a vertical component for transporting the storage containers 106 vertically between the port column 119, 120 and the access station.

The conveyor system may be arranged to transfer storage containers 106 between different framework structures, e.g. as is described in WO2014/075937A1, the contents of which are incorporated herein by reference.

When a storage container 106 stored in one of the columns 105 disclosed in FIG. 1 is to be accessed, one of the container handling vehicles 201, 301 is instructed to retrieve the target storage container 106 from its position and transport it to the drop-off port column 119. This operation involves moving the container handling vehicle 201, 301 to a location above the storage column 105 in which the target storage container 106 is positioned, retrieving the storage container 106 from the storage column 105 using the container handling vehicle's 201, 301 lifting device (not shown), and transporting the storage container 106 to the drop-off port column 119. If the target storage container 106 is located deep within a stack 107, i.e. with one or a plurality of other storage containers 106 positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 1 may have container handling vehicles 201, 301 specifically dedicated to the task of temporarily removing storage containers 106 from a storage column 105. Once the target storage container 106 has been removed from the storage column 105, the temporarily removed storage containers 106 can be repositioned into the original storage column 105. However, the removed storage containers 106 may alternatively be relocated to other storage columns 105.

When a storage container 106 is to be stored in one of the columns 105, one of the container handling vehicles 201, 301 is instructed to pick up the storage container 106 from the pick-up port column 120 and transport it to a location above the storage column 105 where it is to be stored. After any storage containers 106 positioned at or above the target position within the stack 107 have been removed, the container handling vehicle 201, 301 positions the storage container 106 at the desired position. The removed storage containers 106 may then be lowered back into the storage column 105 or relocated to other storage columns 105.

For monitoring and controlling the automated storage and retrieval system 1, e.g. monitoring and controlling the location of respective storage containers 106 within the framework structure 100, the content of each storage container 106; and the movement of the container handling vehicles 201, 301 so that a desired storage container 106 can be delivered to the desired location at the desired time without the container handling vehicles 201, 301 colliding with each other, the automated storage and retrieval system 1 comprises a control system 500 which typically is computerized and which typically comprises a database for keeping track of the storage containers 106.

A problem with the storage grid is that over time dust and dirt will collect in the tracks the container handling vehicle is traveling on. This can damage the vehicle and lead to unnecessary cost and risk. Further, the tracks and even the framework of the underlying storage unit can experience wear and tear over time. As it is now there is no way of surveilling possible faults. A robot would have to stop due to an error over the problem area in order for the problem to be detected. This is a costly and time-consuming way of dealing with the problem.

Another problem with the present situation is that it is no easy way of checking the feet of the storage facility. If there is an alignment problem in a column it can lead to the gripper with or without a container will collide with the column on the way up or down and this will over time cause damage to the equipment. This requires shut down of the storage facility which again is costly and time-consuming.

SUMMARY OF THE INVENTION

The present invention is set forth and characterized in the independent claims, while the dependent claims describe other characteristics of the invention.

In one aspect, the invention is related to a system for condition-based monitoring of an automated storage and retrieval system comprising a framework structure forming a three-dimensional storage grid structure for storing storage containers for storing items, where the grid structure forms vertical storage columns each having a horizontal area defined by the size of an access opening of the vertical storage columns and where the framework structure comprises a rail system arranged above the storage columns, the rail system comprising a plurality of rails extending in an X-direction and a Y-direction to form a grid, the rails defining a perimeter of each access opening on top of each storage column, the rail system providing available routes in the X-direction or the Y-direction for container handling vehicles handling and transferring the storage containers to and from the storage columns, wherein that at least one container handling vehicle has two or more sensors, directed to monitor a section of the rails adjacent of the container handling vehicle, and that the sensors is part of a monitoring system set up to report a condition of the rails of the grid system and uploading the information to one or all of a central computer system, a cloud system and/or an image analysis and processing system and wherein the two or more sensors are at least one camera and a pendulum and/or a level, and/or an accelerometer and/or a sound detecting device.

Further, the at least one sensor can be a camera mounted on the side of the container handling vehicle in the travelling directions of the container handling vehicle such that it is pointing to observe an area of the rail system which is at a level below a height of the at least one camera on the container handling vehicle.

Also, the container handling vehicle can have a camera on all sides of the container handling vehicle such that it is pointing to observe an area of the rail system which is at a level below a height of the at least one camera on the container handling vehicle.

Also, the central computer system, cloud storage and/or image analysis and processing system can be configured to process the information gathered by the at least one sensor.

The at least one camera on each side of the container handling vehicle in the travelling directions of the container handling vehicle can be pointed at an angle of between 0°-89° pointing downwards from a horizontal level.

The at least one camera of the container handling vehicle is mounted on top of the container handling vehicle can be pointed at an angle of between 0°-89° pointing downwards from a horizontal.

The at least one sensor can be in the form of a pendulum and/or a level, and/or an accelerometer and/or a sound detecting device.

The at least one sensor can be mounted on a lifting platform of the container handling vehicle.

There can be at least one sensor connected to each of the wheels on the container handling vehicle.

The at least one sensor can be an accelerometer detecting if the wheels are spinning.

The container handling vehicle can have a sensor for monitoring the tilt and movement of the vehicle.

The at least one sensor can be a sound detecting device on the lifting platform to detect if the container handling vehicle hits an obstacle in a cell during lifting and lowering of containers into a cell of the storage system.

At least one camera can be mounted on the lifting platform of the container handling vehicle.

In a second aspect, the invention concerns a method for condition-based maintenance of an automated storage and retrieval system comprising a framework structure (100) forming a three-dimensional storage grid structure (104) for storing storage containers (106) for storing items, where the grid structure (104) forms vertical storage columns (105) each having a horizontal area defined by the size of an access opening (112) of the vertical storage columns (105) and where the framework structure comprises a rail system (108) arranged on the storage columns (105), the rail system comprising a plurality of rails extending in an X-direction and a Y-direction to form a grid, the rails defining a perimeter of each access opening (112) on top of each storage column (105), the rail system (108) providing available routes for container handling vehicles (201) handling and transferring the storage containers (106) in the X-direction and the Y-direction to and from the storage columns (105), wherein the method comprises the following steps moving a container handling vehicle from one vertical storage column to another vertical storage column in the storage grid, taking an image of an area of the rails, the area including vertical storage columns, using a pendulum and/or a level, and/or an accelerometer and/or a sound detecting device connected to the container handling vehicle to gather additional information regarding rails on the grid, uploading the image to one or all of a central computer system a cloud system and/or an image analysis and processing system, detecting anomalies in the tracks on the grid, a central computer system a cloud system and/or an image analysis and processing system issuing recommendations where to service and/or clean the storage grid based on the analysis of the storage system.

Wherein taking an image can comprise taking an image straight downwards along the sides of the vehicle when the container handling vehicle is stationary above a vertical storage column.

Taking an image can comprise taking an image of the storage grid on each side of the container handling vehicle when the container handling vehicle is stationary above a vertical storage column.

Taking an image can comprise using a camera mounted at an angle of between 0°-89° pointing downwards from a horizontal.

Detecting anomalies in the tracks on the grid can comprise using machine learning to analyse the uploaded images.

Taking an image can comprise using at least one additional camera mounted on the lifting platform of the container handling vehicle.

Also detecting anomalies in the tracks on the grid using machine learning to analyse the uploaded images, including using at least one additional camera mounted on the lifting platform of the container handling vehicle.

Using the present invention as stated in the set of claims solves the problems mentioned above.

BRIEF DESCRIPTION OF THE DRAWINGS

Following drawings are appended to facilitate the understanding of the invention. The drawings show embodiments of the invention, which will now be described by way of example only, where.

DETAILED DESCRIPTION OF THE DRAWINGS

Figure 1:
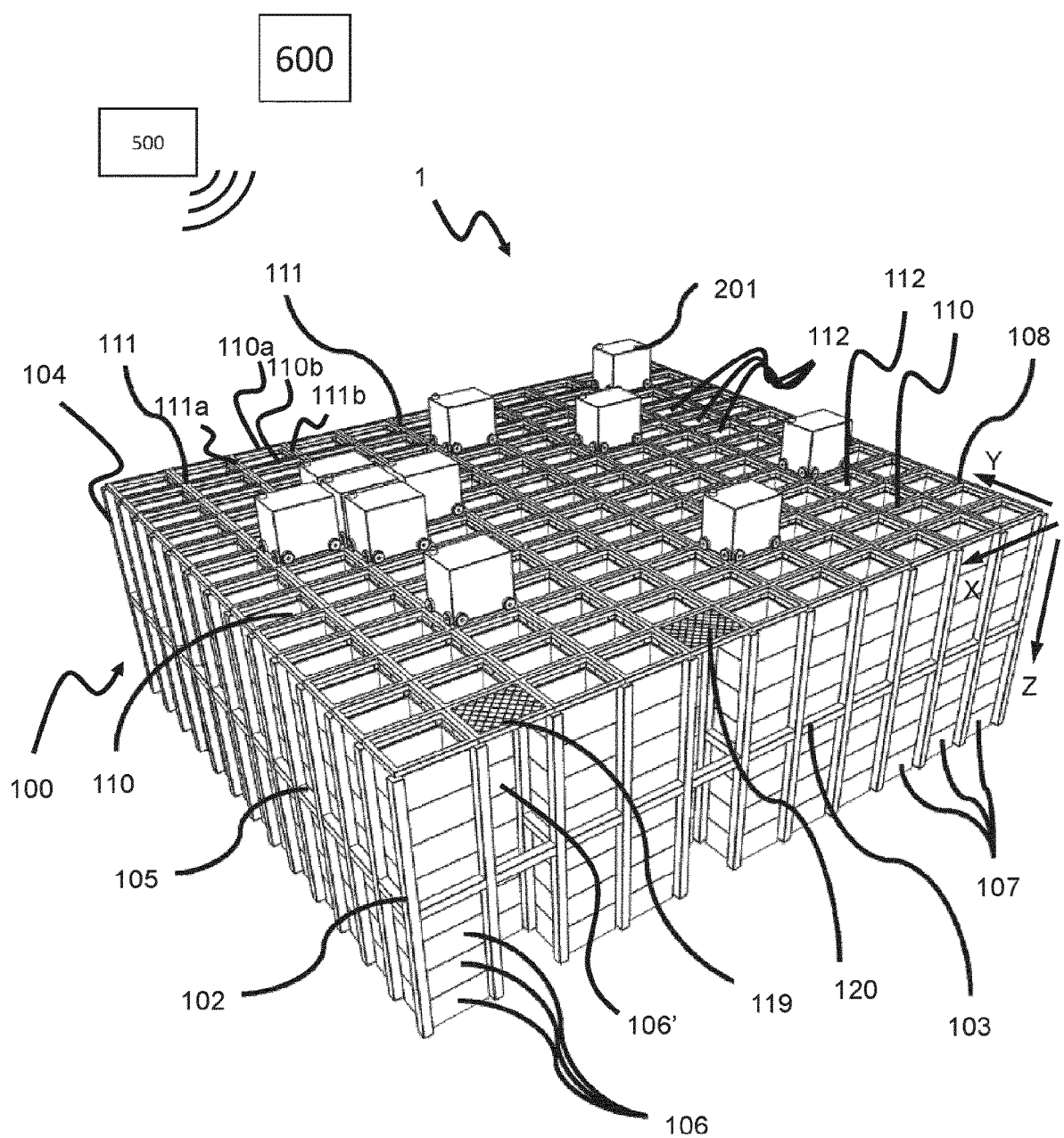
FIG. 1 is a perspective view of a framework structure of a prior art automated storage and retrieval system.

In the following, embodiments of the invention will be discussed in more detail with reference to the appended drawings. It should be understood, however, that the drawings are not intended to limit the invention to the subject-matter depicted in the drawings.

According to a preferred embodiment of the present invention the monitoring of the condition of the storage and retrieval system can be accomplished by at least one container handling vehicle traveling from column to column and performing measurements.

In an alternative embodiment of the present invention the container handling vehicles operating on the storage and retrieval system can monitor the conditions of the storage and retrieval system while working.

In yet another embodiment of the present invention, at least one container handling vehicle can travel from column to column and perform measurements at fixed intervals to detect loose framework or destroyed grid feet or any other measurements that cannot be done during normal operations. Checking for dust, dirt or debris in the tracks on the storage and retrieval system that can be done by a container handling vehicle during ordinary operations.

The framework structure 100 of the automated storage and retrieval system 1 is constructed in accordance with the prior art framework structure 100 described above in connection with FIGS. 1, i.e. a number of upright members 102 and a number of horizontal members 103, which are supported by the upright members 102, and further that the framework structure 100 comprises a first, upper rail system 108 in the X direction and Y direction.

The framework structure 100 further comprises storage compartments in the form of storage columns 105 provided between the members 102, 103, where storage containers 106 are stackable in stacks 107 within the storage columns 105.

The framework structure 100 can be of any size. In particular it is understood that the framework structure can be considerably wider and/or longer and/or deeper than disclosed in FIG. 1. For example, the framework structure 100 may have a horizontal extent of more than 700×700 columns and a storage depth of more than twelve containers.

FIG. 1 is a perspective view of a framework structure of a prior art automated storage and retrieval system.

Figure 2:
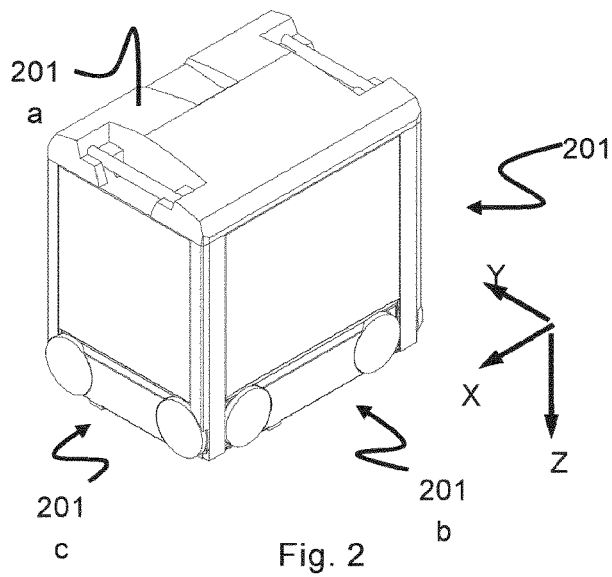
FIG. 2 is a perspective view of a prior art container handling vehicle having a centrally arranged cavity for carrying storage containers therein.
Figure 3:
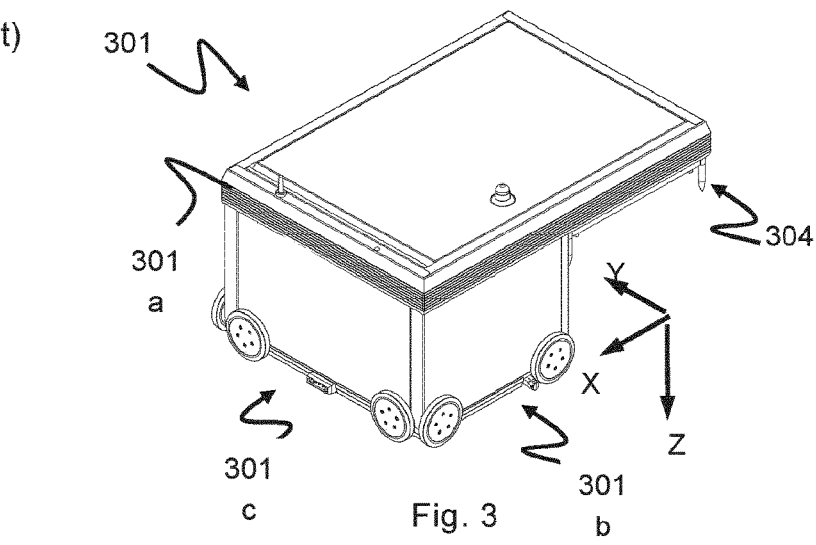
FIG. 3 is a perspective view of a prior art container handling vehicle having a cantilever for carrying storage containers underneath.
Figure 4:
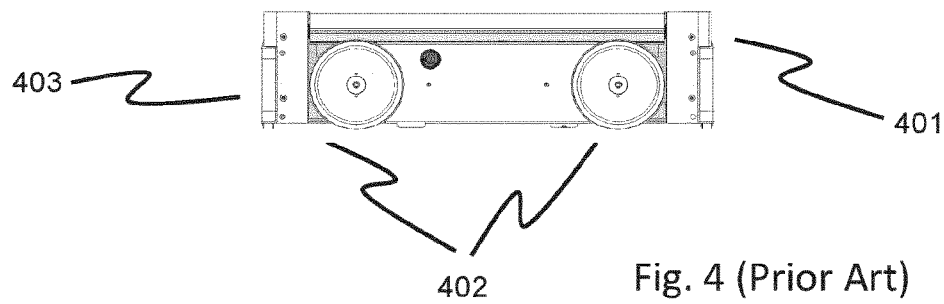
FIG. 4 is a side view of a prior art container handling vehicle wherein a container can be stored on top of the vehicle.

FIGS. 2, 3 and 4 are perspective drawings of a prior art container handling vehicles having a centrally arranged cavity for carrying storage containers therein a cantilever solution for carrying storage containers underneath a container handling vehicle wherein the containers are stored on top of the vehicle.

Figure 5A:
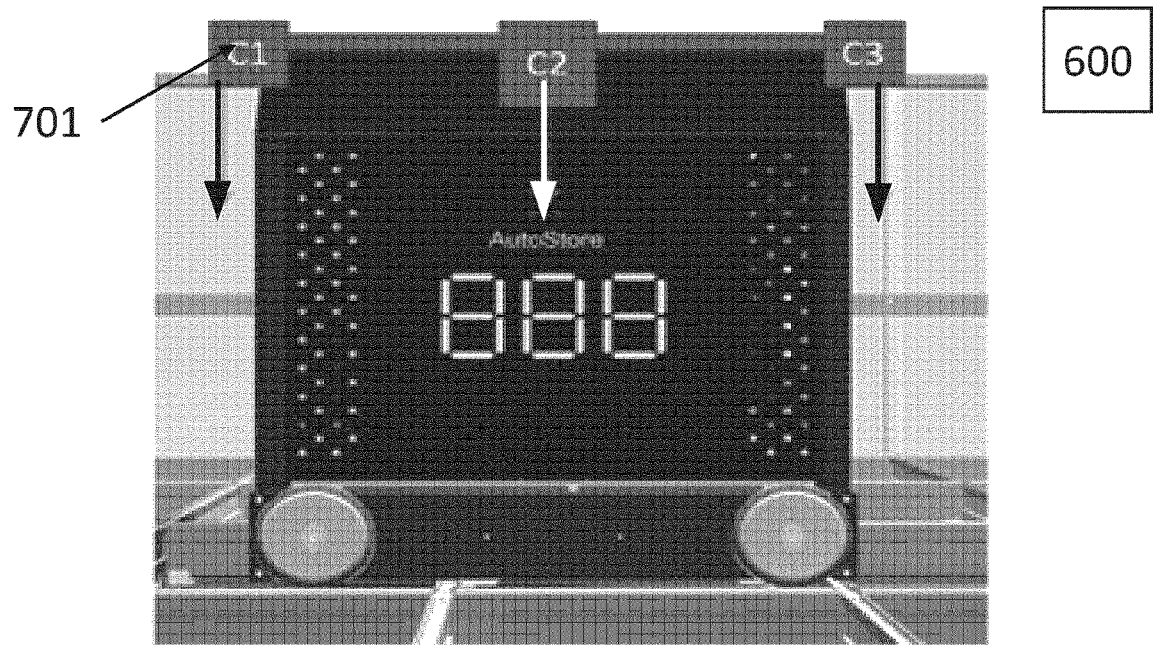
FIG. 5a is a side view of an embodiment of the present invention wherein a container handling vehicle with a central cavity solution has cameras mounted to the sides of the vehicle pointing downwards.

FIG. 5a is a side view of an embodiment of the present invention wherein a container handling vehicle with a central cavity solution has cameras mounted to the sides of the vehicle, and the cameras are pointing downwards.

There is a camera mounted on each side of the container handling vehicle. Each camera is pointing downwards in order to take an image of the tracks framing the column(s) the container handling vehicle is positioned over. This solution gives the closest images of the tracks, so it is possible to establish if there is something in the tracks and optionally what the thing is. If you know what an object on the tracks actually is it is much easier to establish if this is something that requires immediate attention, or if it can be handled later at a slower time of day, when the repairs can be done without the entire storage and retrieval system having to be shut down.

Figure 5B:
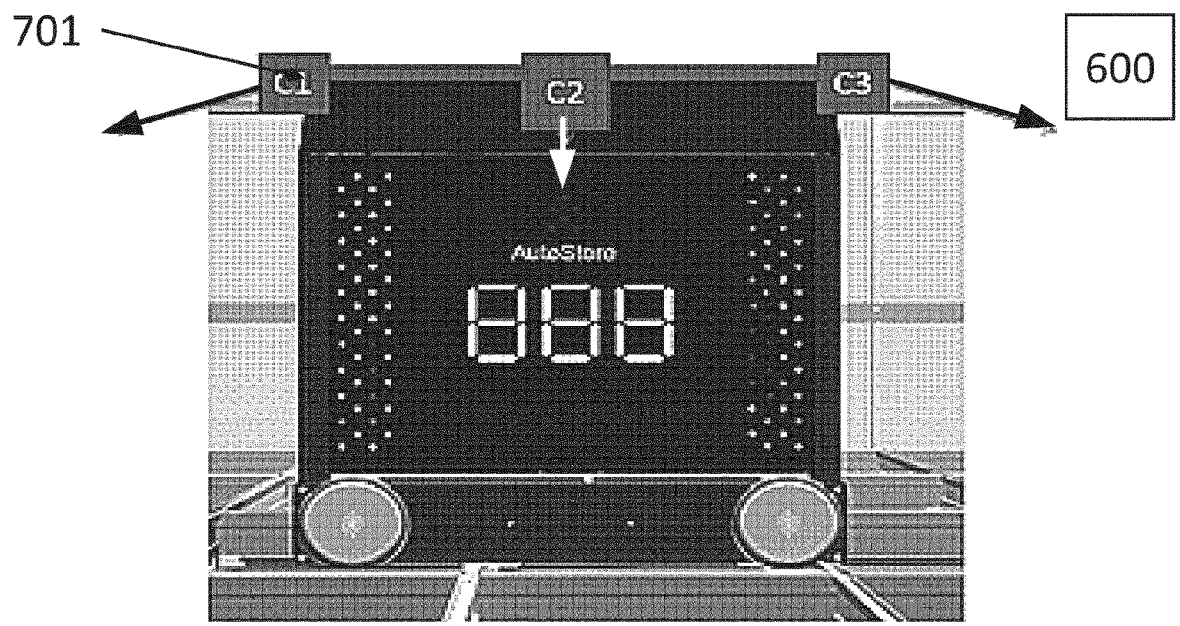
FIG. 5b is a side view of an embodiment of the present invention wherein a container handling vehicle with a central cavity solution has cameras mounted to the sides of the vehicle pointing outwards.

FIG. 5b is a side view of an embodiment of the present invention wherein a container handling vehicle with a central cavity solution has cameras mounted to the sides of the vehicle pointing outwards.

In this solution there is a camera at each side of the container handling vehicle. The camera is pointing at an angle downwards. The angle the camera is pointing could be from 0°-89° down from a horizontal line, meaning straight down to almost horizontal.

In a further solution the camera could be movable so that you could have one camera on each side that covers 180° form straight down to straight up. This solution allows one container handling vehicle to get several images from each side of the container handling vehicle. There are several benefits with this solution. It allows the central computer system or the cloud service or the image analysis and processing system to get more images of each column. This allows the analysis tool to establish what movement of the framework or tracks or grid are due to the weight of the container handling vehicle. So, it is easier to establish how bad a situation actually is, if it is possible to get several images from different angles, from different sides and with or without weight on the tracks right above the column.

Figure 6:
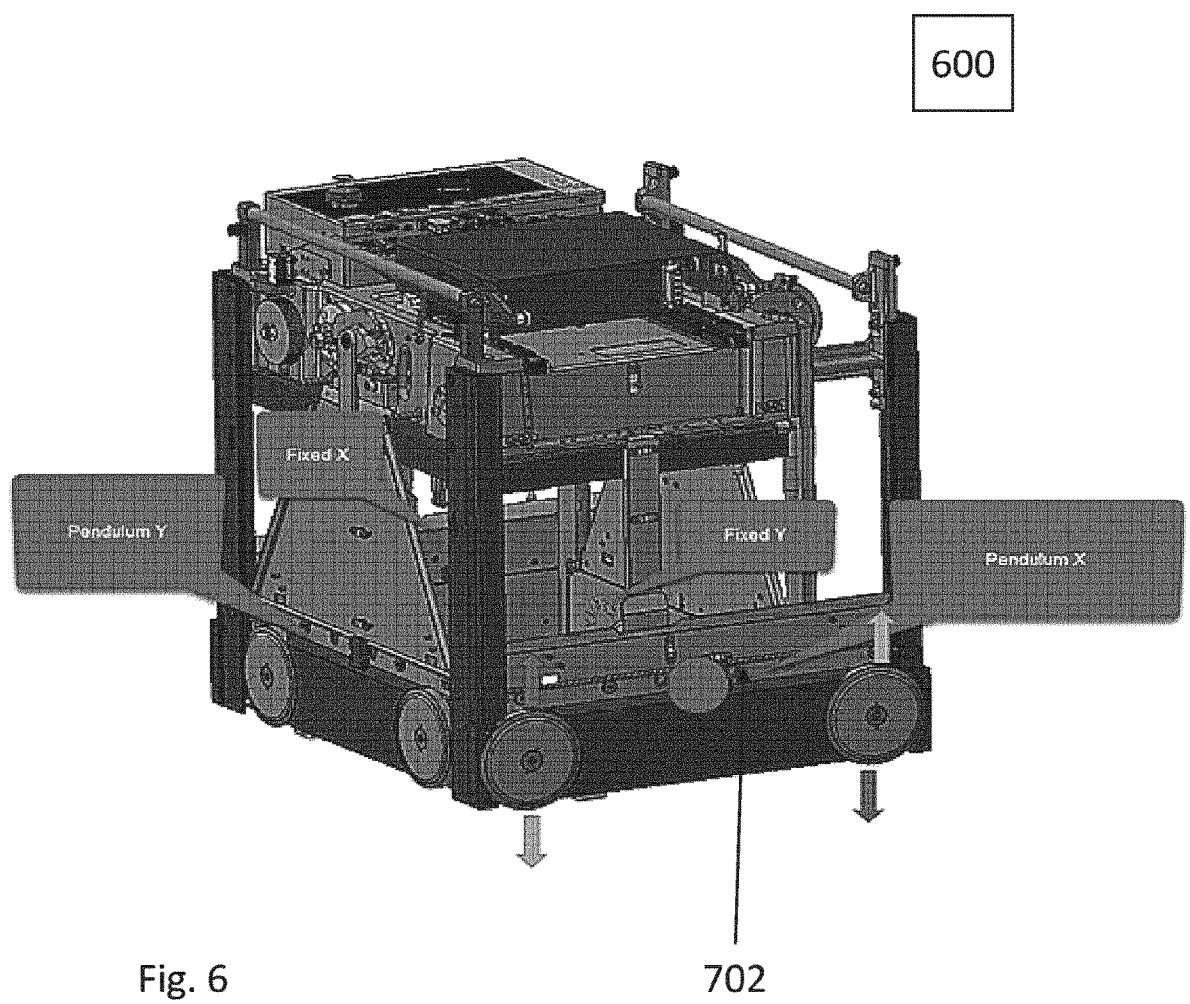
FIG. 6 is a perspective view of a container handling vehicle with a central cavity solution, where the wheel sets of the container handling vehicle has a pendulum function.

FIG. 6 is a perspective view of a container handling vehicle with a central cavity solution, where the wheel sets of the container handling vehicle has a pendulum function. The pendulum function allows two sets of wheels to move at an angle. This adds a measuring instrument on the robot's pendulum, and if the robot pendulum reaches a maximum angle, there is a danger that the unevenness of the cell is higher than the robot can take up, with a potential to lead to collisions.

Another way of detecting unevenness of the tracks would be to add at least one electronic level. This will indicate how many degrees the tracks are out of line and if it is something that e.g. the pendulum of the container handling vehicle can take up or if it is something that requires immediate attention and locking down of parts or all of the storage and retrieval system.

Figure 7A:
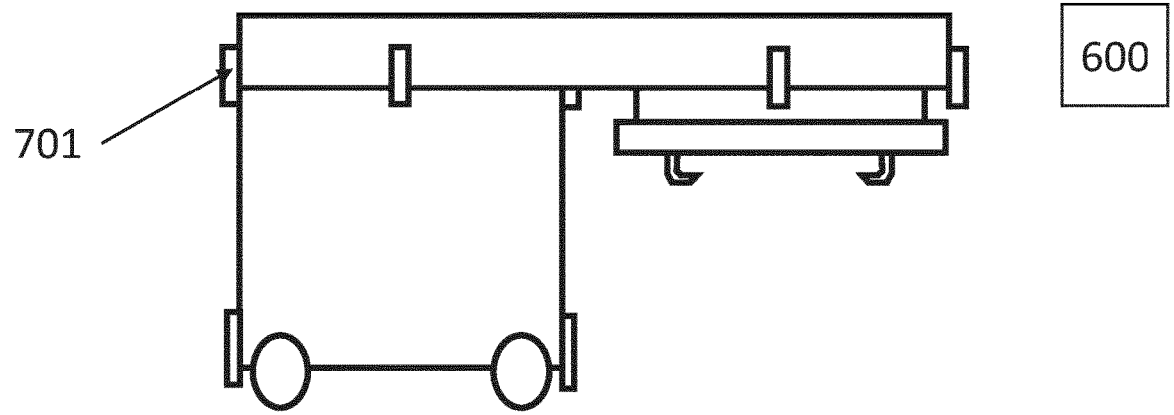
FIG. 7a is a side view of an embodiment of the present invention of a container handling vehicle with a cantilever solution with cameras pointing downwards.

FIG. 7a is a side view of an embodiment of the present invention of a container handling vehicle with a cantilever solution with cameras pointing downwards.

There is a camera mounted on each side of the container handling vehicle. Each camera is pointing downwards in order to take an image of the tracks framing the column(s) the container handling vehicle is positioned over. This solution gives the closest images of the tracks, so it is possible to establish if there is something in the tracks and alternatively what the thing is. If you know what an object on the tracks actually is it is much easier to establish if this is something that requires immediate attention, or if it can be handled later at a slower time of day, when the repairs can be done without the entire storage and retrieval system having to be shut down.

Figure 7B:
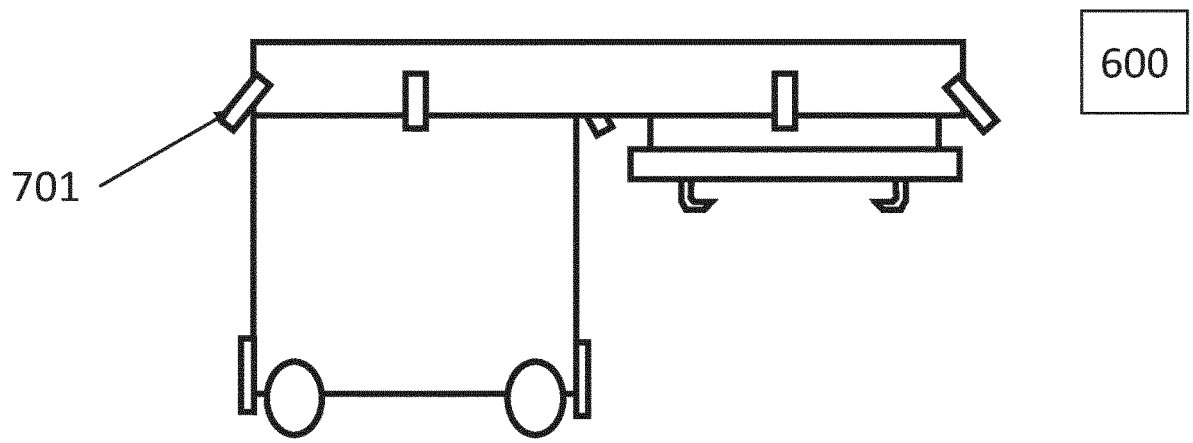
FIG. 7b is a side view of an embodiment of the present invention of a container handling vehicle with a cantilever solution with cameras pointing outwards.

FIG. 7b is a side view of an embodiment of the present invention of a container handling vehicle with a cantilever solution with cameras pointing outwards.

In this solution there is a camera at each side of the container handling vehicle. The camera is pointing at an angle downwards. The angle the camera is pointing in could be from 0-89° down from a horizontal line.

In a further solution the camera could be movable so that you could have one camera on each side that covers 180° form straight down to straight up. This solution allows one container handling vehicle to get several images from each side of the container handling vehicle. There are several benefits with this solution. It allows the central computer system or the cloud service or the image analysis and processing system to get more images of each column. This allows the analysis tool to establish what movement of the framework or tracks or grid are due to the weight of the container handling vehicle. So, it is easier to establish how bad a situation actually is, if it is possible to get several images from different angles, from different sides and with or without weight on the tracks right above the column.

Figure 8A:
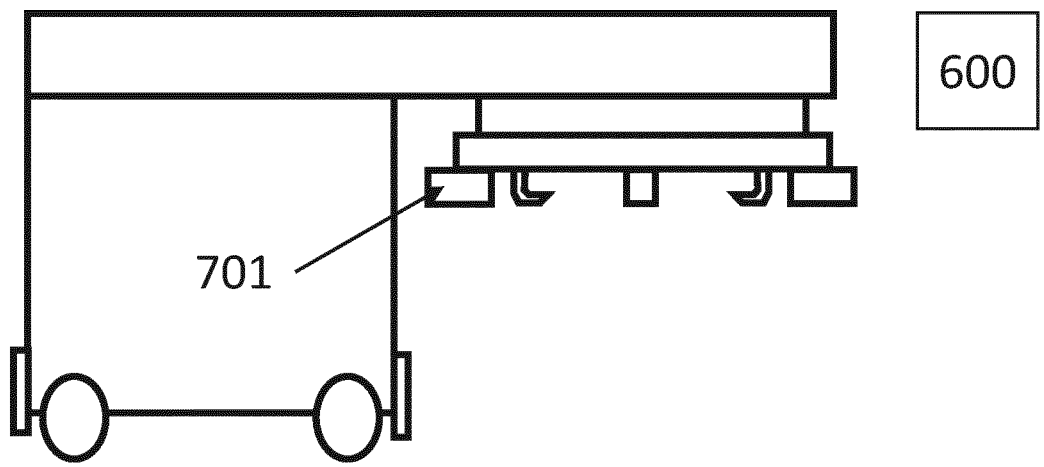
FIG. 8a is a side view of an embodiment of the present invention wherein a container handling vehicle with a cantilever solution wherein the lifting platform has cameras pointing in outwards mounted to it.

FIG. 8a is a side view of an embodiment of the present invention wherein a container handling vehicle with a cantilever solution wherein the lifting platform has cameras pointing in outwards mounted to it.

There is a camera pointing outwards to all sides that allows for the present invention to take images when the lifting platform of the container handling vehicles are lowered into the columns. With this solution it is further possible to take images of the grid feet by lowering the lifting platform all the way down in the column. Further there can be lights on the lifting frame since it can be dark down the columns.

It is also possible to use other types of equipment than cameras to check the condition down the columns. One such example could be a Lidar. This would be a good way of checking the height position of the tracks, and the levels of framework downwards.

Figure 8B:
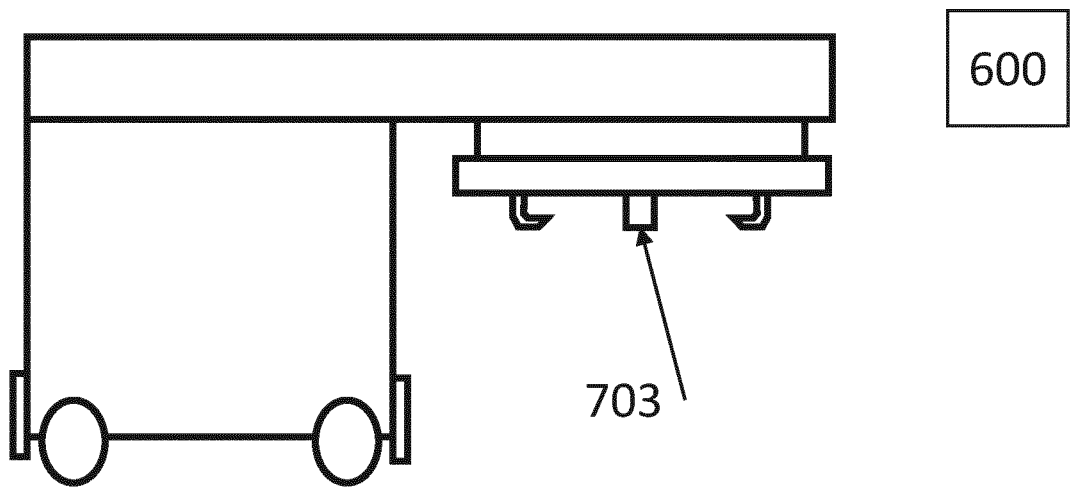
FIG. 8b is a side view of an embodiment of the present invention where a container handling vehicle with a cantilever solution has a camera mounted to the lifting platform pointing downwards.

FIG. 8b is a side view of an embodiment of the present invention where a container handling vehicle with a cantilever solution has a camera mounted to the lifting platform pointing downwards.

There is one camera that can be moved around covering the entire area under the lifting platform. This allows for the present invention to take images when the lifting platform of the container handling vehicles are lowered into the columns. With this solution it is further possible to take images of the grid feet by lowering the lifting platform all the way down in the column. Further there can be lights on the lifting frame since it can be dark down the columns.

It is also possible to use other types of equipment than cameras to check the condition down the columns. One such example could be a Lidar. This would be a good way of checking the height position of the tracks, and the levels of framework downwards.

Although the drawings in FIGS. 8a and 8b show a container handling vehicle with a cantilever solution, this technical feature with attaching one or more cameras to the lifting platform of the container handling vehicle, could just as well be applied to the central cavity solution.

Figure 9A:
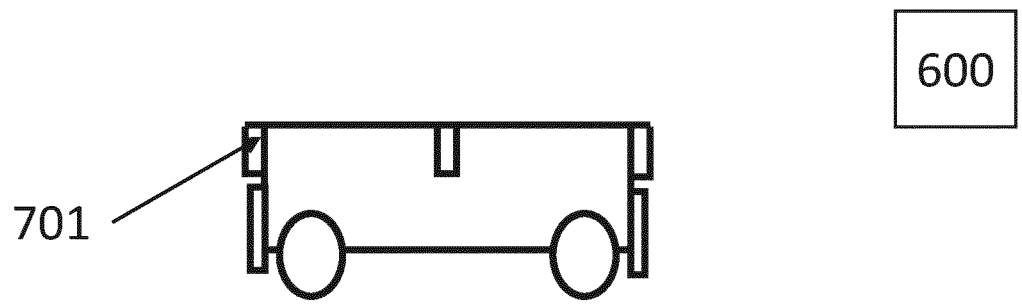
FIG. 9a is a side view of an embodiment of the present invention where a container handling vehicle with a top carrying solution has cameras mounted to the sides pointing downwards.

FIG. 9a is a side view of an embodiment of the present invention where a container handling vehicle with a top carrying solution has cameras mounted to the sides pointing downwards.

There is a camera mounted on each side of the container handling vehicle. Each camera is pointing downwards in order to take an image of the tracks framing the column(s) the container handling vehicle is positioned over. This solution gives the closest images of the tracks, so it is possible to establish if there is something in the tracks and alternatively what the thing is. If you know what an object on the tracks actually is it is much easier to establish if this is something that requires immediate attention, or if it can be handled later at a slower time of day, when the repairs can be done without the entire storage and retrieval system having to be shut down.

Figure 9B:
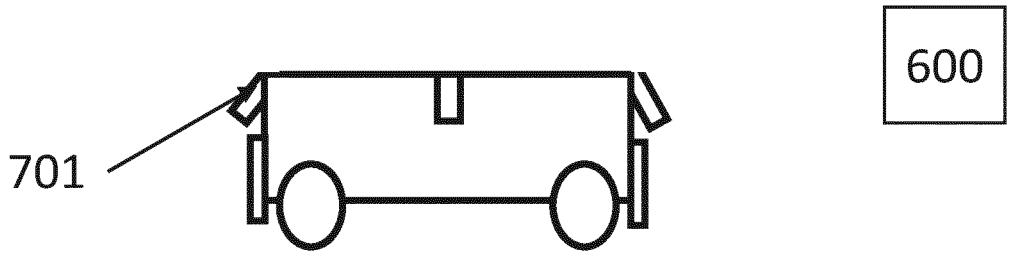
FIG. 9b is a side view of an embodiment of the present invention where a container handling vehicle with a top carrying solution has cameras mounted to the sides pointing outwards.

FIG. 9b is a side view of an embodiment of the present invention where a container handling vehicle with a top carrying solution has cameras mounted to the sides pointing outwards.

In this solution there is a camera at each side of the container handling vehicle. The camera is pointing at an angle downwards. The angle the camera is pointing in could be from 0-89° down from a horizontal line.

In a further solution the camera could be movable so that you could have one camera on each side that covers 180° from straight down to straight up. This solution allows one container handling vehicle to get several images from each side of the container handling vehicle. There are several benefits with this solution. It allows the central computer system or the cloud service or the image analysis and processing system to get more images of each column. This allows the analysis tool to establish what movement of the framework or tracks or grid are due to the weight of the container handling vehicle. So, it is easier to establish how bad a situation actually is, if it is possible to get several images from different angles, from different sides and with or without weight on the tracks right above the column.

Figure 10A:
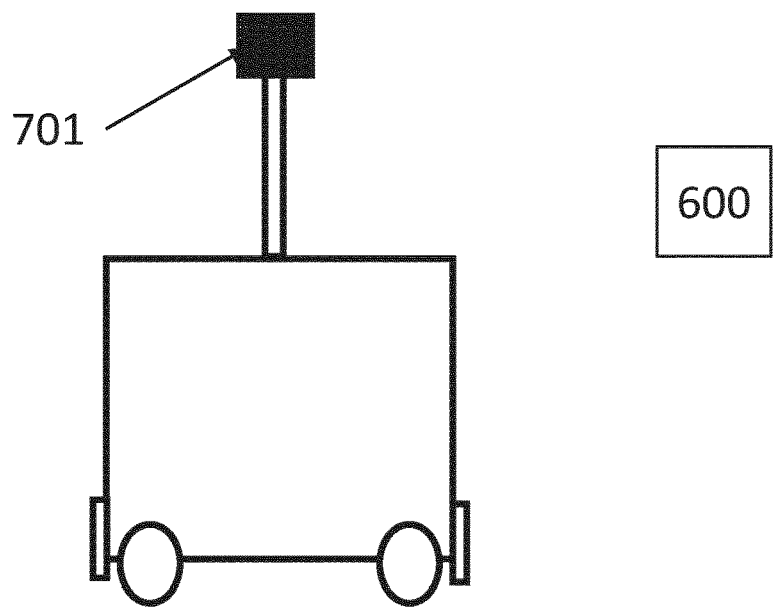
FIG. 10a is a side view of an embodiment of the present invention where a container handling vehicle with a central cavity solution having a top mounted camera.
Figure 10B:
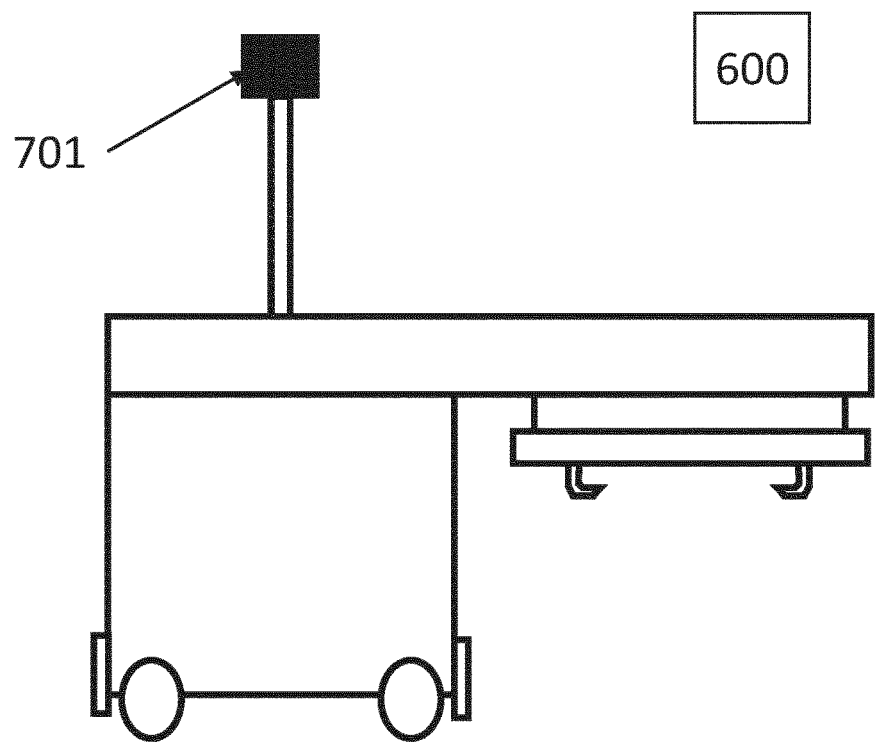
FIG. 10b is a side view of an embodiment of the present invention where a container handling vehicle with a cantilever solution having a top mounted camera.

FIG. 10a is a side view of an embodiment of the present invention where a container handling vehicle with a central cavity solution having a top mounted camera. This camera can take images in all directions by moving the camera around. So, it is a balance of whether it is worth the extra investment when it comes to the number of cameras or if it is more expensive to shut down the storage and retrieval system for a longer period. FIG. 10b is a side view of an embodiment of the present invention where a container handling vehicle with a cantilever solution having a top mounted camera. This is the same technical features as presented in FIG. 10a, only with the top mounted camera mounted on a container handling vehicle with a cantilever solution instead of a central cavity solution.

An additional sensor to use in order to detect problems with unevenness in the framework of the storage and retrieval system is a motion sensor. The motion sensor can detect motion in every direction. The motion is an indication that the tracks or the framework of the storage and retrieval system is wrong and the gathered information can be sent to a central computer system or the cloud service or the image analysis and processing system to analyse where in the storage and retrieval system there is a problem. The motion sensor can give information that the images cannot, like if there are a part of the grid that gives way when there are weight on it. If the framework gives way when the container handling vehicle drives over it the motion sensor can give information like how much does it give way and to which direction. With this information stored it is possible to find out where in the framework there might be a problem.

During analysis there is a benefit when you have measurements of neighbouring columns. It allows the analysis program to get information about the extent and location of the problem. Therefore, in a preferred solution of the present invention if there is identified that there is a problem with one of the columns, images and measurements of neighbouring columns can be used together with information from the column in question in order to get an estimate of the extent of the problem. If the problem is a recent development or if it has gradually become worse over time.

Adding a sound detecting device in the container handling vehicles gripper makes it possible to detect if the container handling vehicle hits an obstacle in a cell during lifting and lowering of containers into a cell of the storage system. A sound recorder can separate undesired noise from the background noise of the operation of a container handling vehicle.

Cameras, lidar, sound and all the other types of sensors can be fitted in a container that can be either grabbed by the lifting platform of the container handling vehicle or placed on top of the container handling vehicle according to FIG. 4.

Also, the container handling vehicle can be fitted with an accelerometer in order to detect if the wheels slip on the tracks.

In the preceding description, various aspects of the delivery vehicle and the automated storage and retrieval system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

LIST OF REFERENCE NUMBERS

Prior art (FIGS. 1-4):
1 Prior art automated storage and retrieval system
100 Framework structure
102 Upright members of framework structure
103 Horizontal members of framework structure
104 Storage grid
105 Storage column
106 Storage container
106' Particular position of storage container
107 Stack
108 Rail system
110 Parallel rails in first direction (X)
110a First rail in first direction (X)
110b Second rail in first direction (X)
111 Parallel rail in second direction (Y)
111a First rail of second direction (Y)
111b Second rail of second direction (Y)
112 Access opening
119 First port column
120 Second port column
201 Prior art storage container vehicle
201a Vehicle body of the storage container vehicle 201
201b Drive means/wheel arrangement, first direction (X)
201c Drive means/wheel arrangement, second direction (Y)
301 Prior art cantilever storage container vehicle
301a Vehicle body of the storage container vehicle 301
301b Drive means in first direction (X)
301c Drive means in second direction (Y)
304 Gripping device
500 Control system
600 Monitoring system
701 Camera
702 Pendulum and/or level and/or accelerometer
703 Lidar and/or sound detecting device
X First direction
Y Second direction
Z Third direction

The invention claimed is:

1. A system for condition-based monitoring of an automated storage and retrieval system comprising:
a framework structure forming a three-dimensional storage grid structure for storing storage containers for storing items, where the grid structure forms vertical storage columns each having a horizontal area defined by a size of an access opening of the vertical storage columns and where the framework structure comprises a rail system arranged above the storage columns,
the rail system comprising a plurality of rails extending in an X-direction and a Y-direction to form a grid, the rails defining a perimeter of each access opening on top of each storage column,
the rail system providing available routes in the X-direction or the Y-direction for container handling vehicles handling and transferring the storage containers to and from the storage columns,
wherein at least one container handling vehicle has two or more sensors, directed to monitor a section of the rails adjacent of the container handling vehicle,
wherein the sensors are part of a monitoring system set up to report a condition of the rails of the grid system and uploading information to one or all of a central computer system, a cloud system, and/or an image analysis and processing system, and wherein the two or more sensors are at least one camera and a pendulum, and/or a level, and/or an accelerometer, and/or a sound detecting device.

2. The system according to claim 1, wherein the at least one sensor is a camera mounted on a side of the container handling vehicle in travelling directions of the container handling vehicle such that it is pointing to observe an area of the rail system which is at a level below a height of the at least one camera on the container handling vehicle.

3. The system according to claim 1, wherein the container handling vehicle can have a camera on all sides of the container handling vehicle such that it is pointing to observe an area of the rail system which is at a level below a height of the at least one camera on the container handling vehicle.

4. The system according to claim 1, wherein the central computer system, cloud storage, and/or image analysis and processing system is configured to process the information gathered by the at least one sensor.

5. The system according to claim 1, wherein the at least one camera on each side of the container handling vehicle in travelling directions of the container handling vehicle at an angle of between 0°-89° pointing downwards from a horizontal level.

6. The system according to claim 1, wherein the at least one camera of the container handling vehicle is mounted on top of the container handling vehicle at an angle of between 0°-89° pointing downwards from a horizontal.

7. The system according to claim 1, wherein the at least one sensor is mounted on a lifting platform of the container handling vehicle.

8. The system according to claim 1, wherein there is at least one sensor connected to each wheel on the container handling vehicle.

9. The system according to claim 1, wherein the at least one sensor is an accelerometer detecting if wheels on the container handling vehicle are spinning.

10. The system according to claim 9, wherein the container handling vehicle has a sensor for monitoring tilt and movement of the vehicle.

11. The system according to claim 10, wherein the at least one sensor is a sound detecting device on a lifting platform of the container handling vehicle to detect if the container handling vehicle hits an obstacle in a cell during lifting and lowering of containers into a cell of the storage system.

12. The system according to claim 1 wherein at least one camera is mounted on a lifting platform of the container handling vehicle.

13. A method for condition-based maintenance of an automated storage and retrieval system comprising a framework structure forming a three-dimensional storage grid structure for storing storage containers for storing items, where the grid structure forms vertical storage columns each having a horizontal area defined by a size of an access opening of the vertical storage columns and where the framework structure comprises a rail system arranged on the storage columns, the rail system comprising a plurality of rails extending in an X-direction and a Y-direction to form a grid, the rails defining a perimeter of each access opening on top of each storage column, the rail system providing available routes for container handling vehicles handling and transferring the storage containers in the X-direction and the Y-direction to and from the storage columns, wherein the method comprises:
 moving a container handling vehicle from one vertical storage column to another vertical storage column in the storage grid,
 taking an image of an area of the rails, the area including vertical storage columns,
 using a pendulum and/or a level, and/or an accelerometer and/or a sound detecting device connected to the container handling vehicle to gather additional information regarding rails on the grid,
 uploading the image to one or all of a central computer system a cloud system and/or an image analysis and processing system,
 detecting anomalies in tracks on the grid, a central computer system, a cloud system, and/or an image analysis and processing system issuing recommendations where to service and/or clean the storage grid based on the analysis of the storage system.

14. The method according to claim 13 wherein taking an image comprises taking an image straight downwards along sides of the vehicle when the container handling vehicle is stationary above a vertical storage column.

15. The method according to claim 13, wherein taking an image comprises taking an image of the storage grid on each side of the container handling vehicle when the container handling vehicle is stationary above a vertical storage column.

16. The method according to claim 13, wherein taking an image comprises using a camera mounted at an angle of between 0°-89° pointing downwards from a horizontal.

17. The method according to claim 13, wherein detecting anomalies in the tracks on the grid comprises using machine learning to analyse the uploaded images.

18. The method according to claim 13, wherein taking an image comprises using at least one additional camera mounted on a lifting platform of the container handling vehicle.

* * * * *